UNITED STATES PATENT OFFICE.

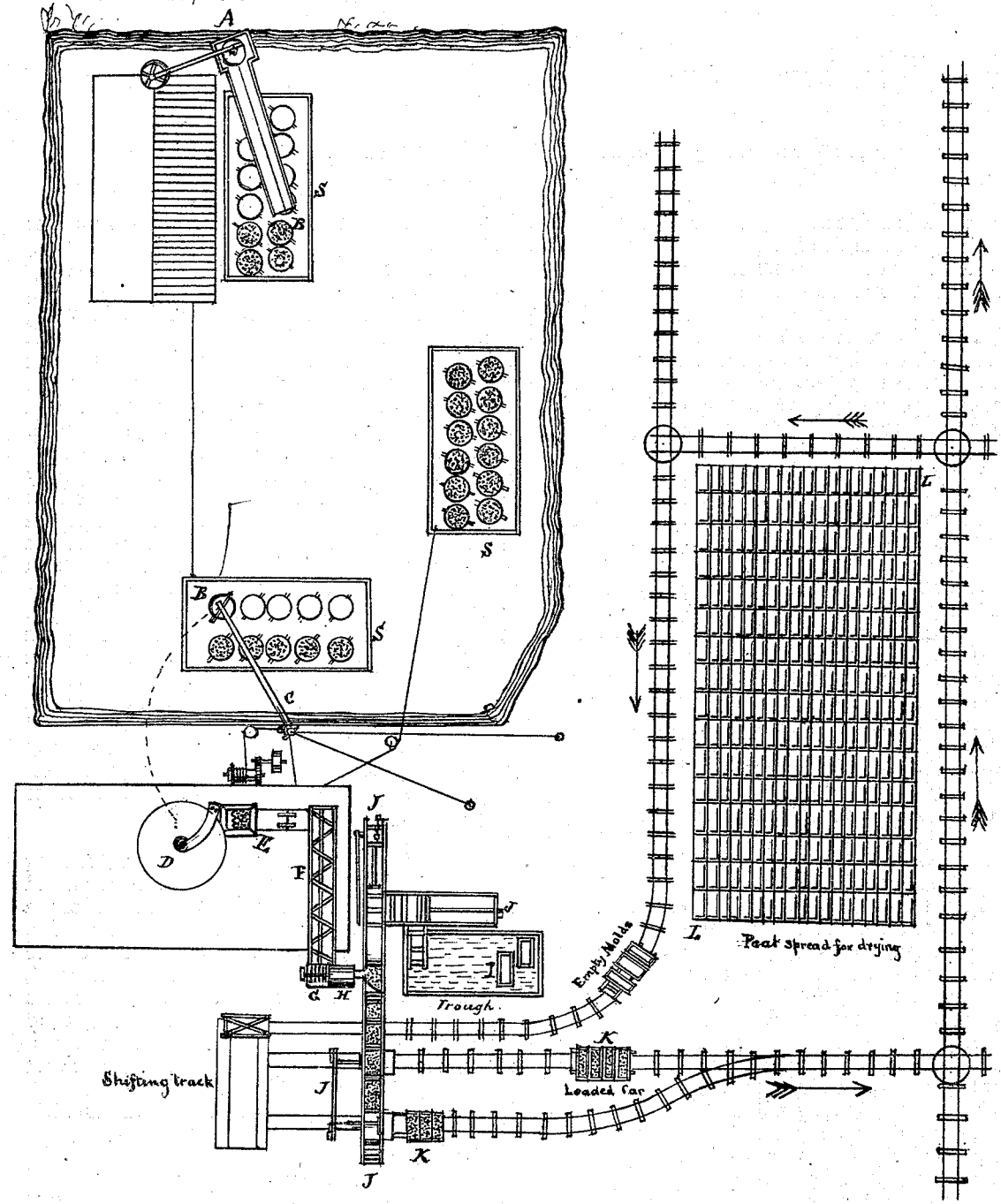

EDWIN JAMES HULBERT AND AIMÉ-NICHOLAS NAPOLEON AUBIN, OF PORTLAND, CONNECTICUT.

IMPROVEMENT IN THE TREATMENT OF PEAT FOR FUEL.

Specification forming part of Letters Patent No. 122,173, dated December 26, 1871.

Specification describing the combination of Processes and Mechanical Appliances for the Treatment of Peat for Fuel, invented by EDWIN JAMES HULBERT and AIMÉ-NICHOLAS NAPOLEON AUBIN, both of Portland, county of Middlesex and State of Connecticut.

The nature of our invention consists in combining into one system the several devices and processes previously invented by us for the digging, transporting, elevating, cleaning, grinding, molding, and spreading of peat to transform it into a dry, hard, and condensed fuel.

The accompanying drawing is a plan of the general arrangement of peat-works operated on our system, and shows the relative position of the different machines used.

A is a floating scow, upon which is placed the machinery for digging the peat, a device which removes the necessity of draining the swamp. It may be an ordinary dredging apparatus; but better yet the peat-auger, for which a patent was granted to A. N. N. AUBIN, one of the petitioners, on the 25th January, 1870. B B are buckets, carried upon scows S S, which continually travel between the digging apparatus and the grinding-machinery. These buckets are made specially for the purpose, and a patent was granted for them to E. J. HULBERT and A. N. N. AUBIN, the present petitioners, on the 31st of October, 1871. The buckets are raised by means of derricks C, and dumped upon a revolving table, D, which brings the material near the screw-elevator F, (for which a patent was granted to the present petitioners on the 1st August, 1871.) This elevator propels the peat to the grinding-machine in a constant stream, divides it, and, by expelling a large portion of the air occupying the space between the large lumps, contributes materially to make the fuel more compact. E is a peat-wringer, for which a patent was granted to A. N. N. AUBIN, one of the petitioners, on the 1st August, 1871. It is used principally when moss or very spongy peat is brought up by the digger to expel the superabundant water retained between the fibers. It is placed where shown in the plan, but can also be fixed to the digging-scow or upon a float near it, and the peat expelled from it can fall directly into the buckets. G is a peat-slicer and cleaner, for which a patent was granted to A. N. N. AUBIN, one of the petitioners, on the 2d August, 1870. It subdivides the crude substance and separates from it stones, hard roots, brushwood, &c. H is a grinding and puddling machine, for which a patent was granted to A. N. N. AUBIN, one of the petitioners, on the 28th December, 1869. This device transforms the crude, fibrous, and spongy peat into a homogeneous pulp, which falls into the mold I, furnished with a movable bottom, the operation and use of which is described in the patent granted to A. N. N. AUBIN, on the 27th October, 1868. J J are automatic conveyers, for which a patent was granted to the same petitioner on the 25th January, 1870. From the conveyers the molds, filled with freshly-ground peat, are placed upon cars K, pushed by hand or drawn by a system of ropes and so combined as to travel in one direction, forming a circuit of full and empty cars; they are dumped or upset upon the ground, and the pulpy mass divided by indentations caused by the movable bottom, is left to dry, and separate into suitable pieces.

What we claim as our invention is—

The combination, into a system of treating peat for fuel, of a series of devices, enumerated in the above specification, by which the crude material is dug up from its position in the swamp, deprived of its excess of water, carried to the grinding-machinery, elevated, divided, cleaned, and liberated from foreign substances, ground and puddled, molded and spread upon the ground for drying by natural heat, the whole substantially, and for the purpose, as hereinbefore set forth.

EDWIN JAMES HULBERT.
N. AUBIN.

Witnesses:
FRANCES C. HULBERT,
MARIA J. SHEARMAN. (61)